United States Patent
Takamura et al.

(10) Patent No.: US 7,883,422 B2
(45) Date of Patent: Feb. 8, 2011

(54) SHAFT-DRIVE-TYPE POWER TRANSMISSION DEVICE OF A VEHICLE

(75) Inventors: Toshiaki Takamura, Saitama (JP); Shinji Takayanagi, Saitama (JP); Makoto Igarashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 282 days.

(21) Appl. No.: 11/902,345

(22) Filed: Sep. 20, 2007

(65) Prior Publication Data

US 2008/0188316 A1    Aug. 7, 2008

(30) Foreign Application Priority Data

Sep. 26, 2006 (JP) .............. 2006-261298

(51) Int. Cl.
*F16D 7/00* (2006.01)
(52) U.S. Cl. ........................................ 464/34; 180/227
(58) Field of Classification Search ............. 464/30, 464/34, 35, 41, 76, 83; 180/226, 227, 348, 180/385

See application file for complete search history.

(56) References Cited

U.S. PATENT DOCUMENTS

| | | | | |
|---|---|---|---|---|
| 2,164,870 A | * | 7/1939 | De Salardi | ................ 464/35 X |
| 2,224,440 A | * | 12/1940 | Lewis | |
| 2,435,021 A | * | 1/1948 | Seider | .................... 180/227 X |
| 2,977,779 A | * | 4/1961 | Steinke et al. | |
| 3,997,043 A | | 12/1976 | Kondo et al. | |
| 4,344,306 A | * | 8/1982 | Citron | ......................... 464/34 |
| 7,210,565 B2 | * | 5/2007 | Yamazaki et al. | |
| 2003/0153388 A1 | * | 8/2003 | Ima | |
| 2008/0078602 A1 | * | 4/2008 | Igarashi et al. | .............. 180/227 |
| 2009/0205921 A1 | * | 8/2009 | Burns et al. | |

FOREIGN PATENT DOCUMENTS

| | | | | |
|---|---|---|---|---|
| CH | 227654 A | | 6/1943 | |
| DE | 1 008 063 | | 5/1957 | |
| DE | 25 39 665 | | 3/1976 | |
| JP | 36-12611 Y | | 5/1961 | |
| JP | 56-163995 A | | 12/1981 | |
| JP | 7-42790 A | | 2/1995 | |
| JP | 11-230188 A | | 8/1999 | |
| JP | 2001-241507 A | | 9/2001 | |
| LU | 35284 | * | 7/1957 | .................. 464/34 |
| SU | 420824 | * | 8/1974 | .................. 464/34 |
| SU | 420824 | * | 9/1974 | .................. 464/34 |

* cited by examiner

*Primary Examiner*—Greg Binda
(74) *Attorney, Agent, or Firm*—Birch, Stewart, Kolasch & Birch, LLP

(57) ABSTRACT

To realize the reduction of weight of a power transmission device by overcoming a drawback that an excessively large rotational torque is transmitted to a power transmission path and to sufficiently suppress the generation of a change of a rotational speed by overcoming a drawback that phases between one universal joint and another universal joint are displaced from each other. A damper mechanism is provide in the course of a power transmission path from an engine to a final reduction gear. The damper mechanism transmits a torque from the engine until the torque arrives at a predetermined value and prevents the transmission of a torque that exceeds the predetermined value.

14 Claims, 9 Drawing Sheets

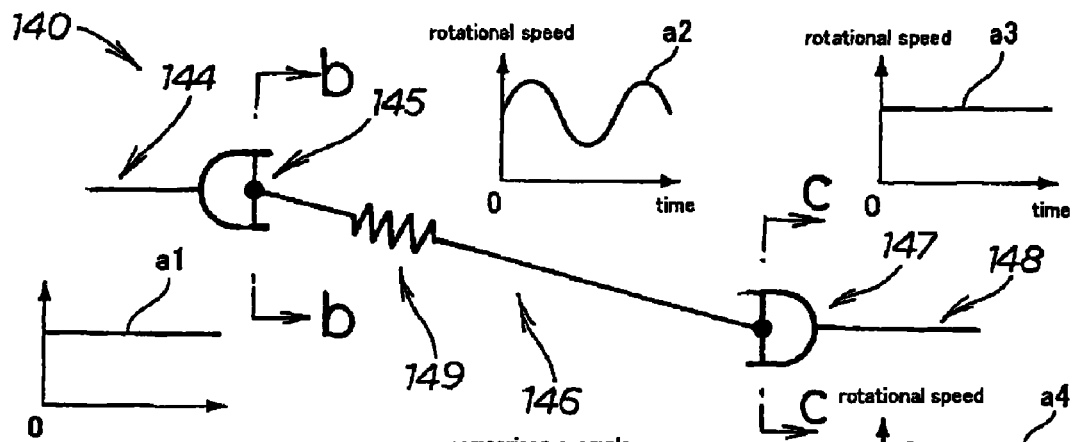
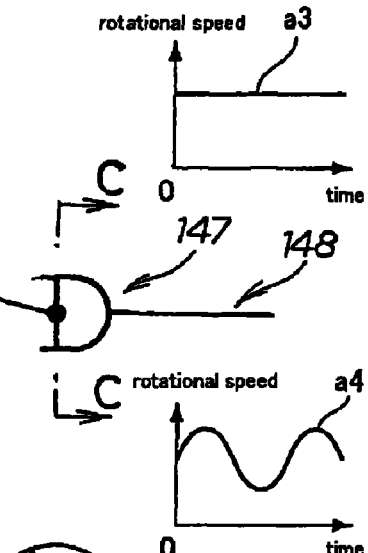
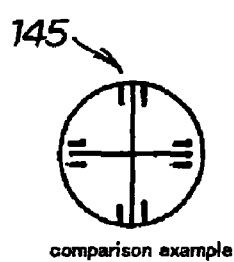
FIG. 7(a)
FIG. 7(b)
FIG. 7(c)
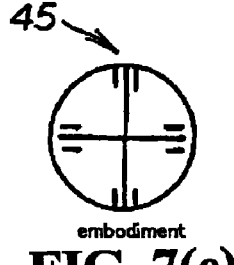
FIG. 7(d)
FIG. 7(e)
FIG. 7(f)

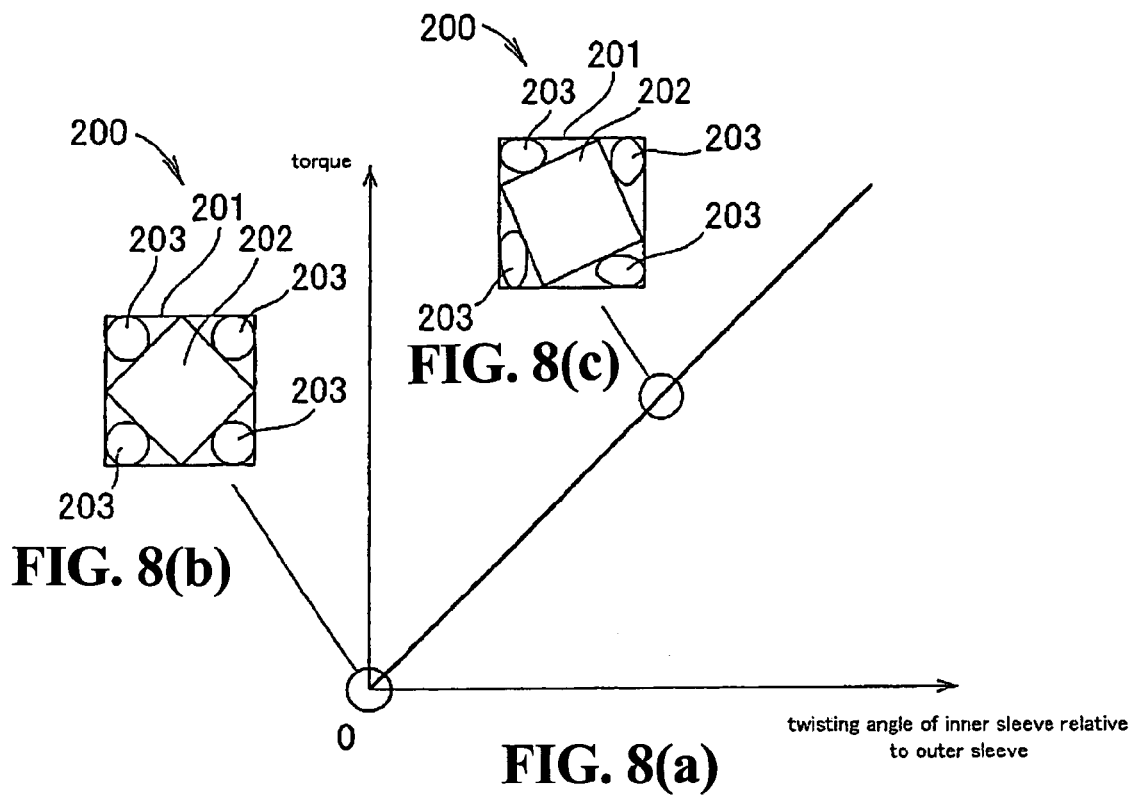
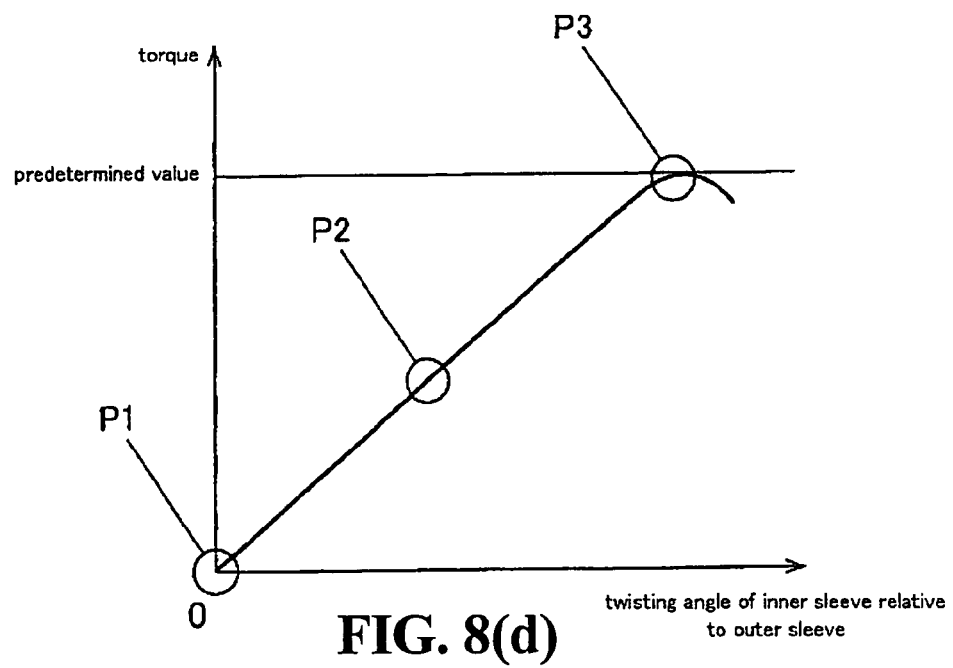

SHAFT-DRIVE-TYPE POWER TRANSMISSION DEVICE OF A VEHICLE

CROSS-REFERENCE TO RELATED APPLICATIONS

This nonprovisional application claims priority under 35 U.S.C. §119(a) on Patent Application No. 2006-261298, filed in Japan on Sep. 26, 2006, the entirety of which is incorporated herein by reference.

BACKGROUND OF THE INVENTION

1. Field of the Invention

The present invention relates to a shaft-drive-type power transmission device of a vehicle. In particular, the shaft-drive type power transmission device transmits a rotational driving force of an engine to an input shaft on a wheel side from an output shaft on an engine side by way of a drive shaft.

2. Background of the Invention

A shaft-drive-type power transmission device that connects one end of a propeller shaft to an output shaft on an engine side by way of a universal joint and connects another end of the propeller shaft to an input shaft on a wheel side by way of another universal joint has been practically used.

Such a shaft-drive-type power transmission device has been known, which divides a propeller shaft in two and interposes a damper mechanism for dampening an impact between two divided propeller shafts (for example, see JP-A-56-163995 (page 4, FIG. 2)).

A technique of JP-A-56-163995 will now be explained. The conventional shaft-drive-type power transmission device is a shaft-drive-type power transmission device for a hull and is constituted of an output shaft (first shaft) which extends from an engine, the propeller shaft (second shaft) which has one end thereof connected to the output shaft by way of one universal joint, and an input shaft (third shaft) which is connected to another end of the propeller shaft by way of another universal joint.

The propeller shaft is constituted of an output-shaft-side shaft portion that is connected to one universal joint, an input-shaft-side shaft portion that is connected to another universal joint, and a damper mechanism that is interposed between these shaft portions.

However, although the conventional shaft-drive-type power transmission device can dampen an impact attributed a torque transmitted from the output shaft to the input shaft by way of the propeller shaft by the damper mechanism, it is necessary to ensure the rigidity of the propeller shaft, a final reduction gear and the like by estimating a case that a relatively large back torque or the like (excessively large torque) is applied to the propeller shaft, the final reduction gear and the like.

In general, it is known that when two shafts are connected by a universal joint and the shaft-drive-type power transmission device is used in a state these shafts are bent by the universal joint, a rotational speed is changed. Accordingly, in connecting one end of the second shaft to the first shaft by way of one universal joint and connecting a third shaft to another end of the second shaft by way of another universal joint, it may be possible to cancel the change of the rotational speed generated by one universal joint with the change of the rotational speed generated by another universal joint by selectively determining a phase between one universal joint and another universal joint.

In the conventional shaft-drive-type power transmission device, since the damper mechanism is interposed in the propeller shaft (second shaft), there exists a drawback that phases of one universal joint and another universal joint which are set for canceling the change of the rotational speed are displaced from each other.

Further, in the conventional shaft-drive-type power transmission device, due to the provision of the damper mechanism in the propeller shaft, there exists a possibility that an unsprung weight is increased.

That is, there exists a demand for a shaft-drive-type power transmission device of a vehicle which can prevent an excessively large torque from being applied to a power transmission path, can prevent phases of one universal joint and another universal joint from being displaced from each other, and can suppress the increase of an unsprung weight.

SUMMARY OF THE INVENTION

It is an object of the present invention to provide a shaft-drive-type power transmission device of a vehicle that can overcome a drawback that an excessively large torque is applied to a power transmission path thus reducing a weight of the power transmission device by lowering rigidity of constitutional parts of the power transmission path. It is another object of the present invention to provide a shaft-drive-type power transmission device of a vehicle that can overcome a drawback that phases of one universal joint and another universal joint are displaced from each other thus suppressing the generation of a change of a rotational speed sufficiently. It is another object of the present invention to provide a shaft-drive-type power transmission device of a vehicle that can overcome a drawback that an unsprung weight is increased thus enhancing the riding feeling.

A first aspect of the present invention is directed to a shaft-drive-type power transmission device of a vehicle which includes: an output shaft which extends from an engine and outputs a rotational driving force of the engine; a propeller shaft which has one end thereof connected to the output shaft by way of a first universal joint and transmits the rotational driving force of the engine; and an input shaft which is connected to another end of the propeller shaft by way of a second universal joint and inputs the rotational driving force of the engine to a final reduction gear on a wheel side, wherein in the course of a power transmission path from the engine to the final reduction gear, a damper mechanism which transmits a torque transmitted from the engine or a wheel until the torque arrives at a predetermined value and prevents the transmission of the torque when the torque exceeds the predetermined value is provided.

According to a second aspect of the present invention, the vehicle is a motorcycle.

According to a third aspect of the present invention, the damper mechanism is mounted on either one of the output shaft and the input shaft.

According to a fourth aspect of the present invention, the damper mechanism is mounted on the output shaft.

According to a fifth aspect of the present invention, the damper mechanism includes an outer sleeve which is connected to either one of the engine side and the final reduction gear side, a plurality of outer-sleeve-side recessed portions which are formed on an inner peripheral surface of the outer sleeve at an equal pitch in the circumferential direction and have an axially predetermined length, an inner sleeve which is connected to another of the final reduction gear side and the engine side, inner-sleeve-side recessed portions as many as the outer-sleeve-side recessed portions which are formed on an outer peripheral surface of the inner sleeve at an equal pitch in the circumferential direction and have an axially predetermined length, and a plurality of cylindrical resilient members which are accommodated between the inner-sleeve-side recessed portions and the outer-sleeve-side recessed portions in a state that each one is accommodated between inner-sleeve-side recessed portion and the outer-sleeve-side recessed portion.

According to a sixth aspect of the present invention, the plurality of outer-sleeve-side recessed portions and the plurality of inner-sleeve-side recessed portions are formed in a corrugated shape which is formed of continuous curves as viewed in a cross section in the circumferential direction.

According to the first aspect of the present invention, in the course of a power transmission path from the engine to the final reduction gear, the damper mechanism which transmits the torque transmitted from the engine or the wheel until the torque arrives at the predetermined value and prevents the transmission of the torque which exceeds the predetermined value when the torque exceeds the predetermined value is provided. Due to such a constitution, it is possible to prevent an excessively large rotational torque from being applied to the power transmission path. As a result, it is possible to obtain an advantageous effect that the rigidity of constitutional part of the power transmission path ranging from the engine to the final reduction gear can be reduced and hence, the shaft-drive-type power transmission device can be made light-weighted.

According to the second aspect of the present invention, the vehicle is the motorcycle and hence, different from a motorcycle that adopts a chain drive, for example, it is unnecessary to frequently adjust the elongation of a chain. Accordingly, it is possible to obtain an advantageous effect that an interval of maintenance or inspection of the motorcycle can be prolonged.

According to the third aspect of the present invention, the damper mechanism is mounted on either one of the output shaft and the input shaft and hence, there is no possibility that phases of the first and second universal joints, which are preliminarily set, are not displaced from each other. Accordingly, it is possible to sufficiently suppress the generation of a change of the rotational speed. As a result, it is possible to obtain an advantageous effect that the riding feeling of the motorcycle is improved.

According to the fourth aspect of the present invention, the damper mechanism is mounted on the output shaft and hence, an unsprung weight can be reduced. Accordingly, it is possible to obtain an advantageous effect that riding feeling of the motorcycle is improved.

According to the fifth aspect of the present invention, the damper mechanism is constituted of the outer sleeve which is connected to either one of the engine side and the final reduction gear side, the plurality of outer-sleeve-side recessed portions which are formed on the inner peripheral surface of the outer sleeve at an equal pitch in the circumferential direction and have the axially predetermined length, the inner sleeve which is connected to another of the final reduction gear side and the engine side, the inner-sleeve-side recessed portions as many as the outer-sleeve-side recessed portions which are formed on an outer peripheral surface of the inner sleeve at an equal pitch in the circumferential direction and have the axially predetermined length, and the plurality of cylindrical resilient members which are accommodated between the inner-sleeve-side recessed portions and the outer-sleeve-side recessed portions in a state that each one is accommodated between inner-sleeve-side recessed portion and the outer-sleeve-side recessed portion. Due to such a constitution, the plurality of cylindrical resilient members can absorb an impact and, at the same time, allow a slippage between the outer sleeve and the inner sleeve when a large load change is generated. Accordingly, it is possible to obtain an advantageous effect that the applying of a torque that exceeds a predetermined value (excessively large torque) to a power transmission path can be reduced.

According to the sixth aspect of the present invention, the plurality of outer-sleeve-side recessed portions and the plurality of inner-sleeve-side recessed portions are formed in a corrugated shape which is formed of continuous curves as viewed in a cross section in the circumferential direction thus allowing a smooth slippage between the outer sleeve and the inner sleeve.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 7(a) to 7(f) are comparison explanatory views showing the manner of operation of the shaft-drive-type power transmission device shown in FIG. 2;

FIGS. 8(a) to 8(d) are comparative explanatory views showing a torque of the shaft-drive-type power transmission device shown in FIG. 7.

DETAILED DESCRIPTION OF THE PREFERRED EMBODIMENTS

Figure 1:
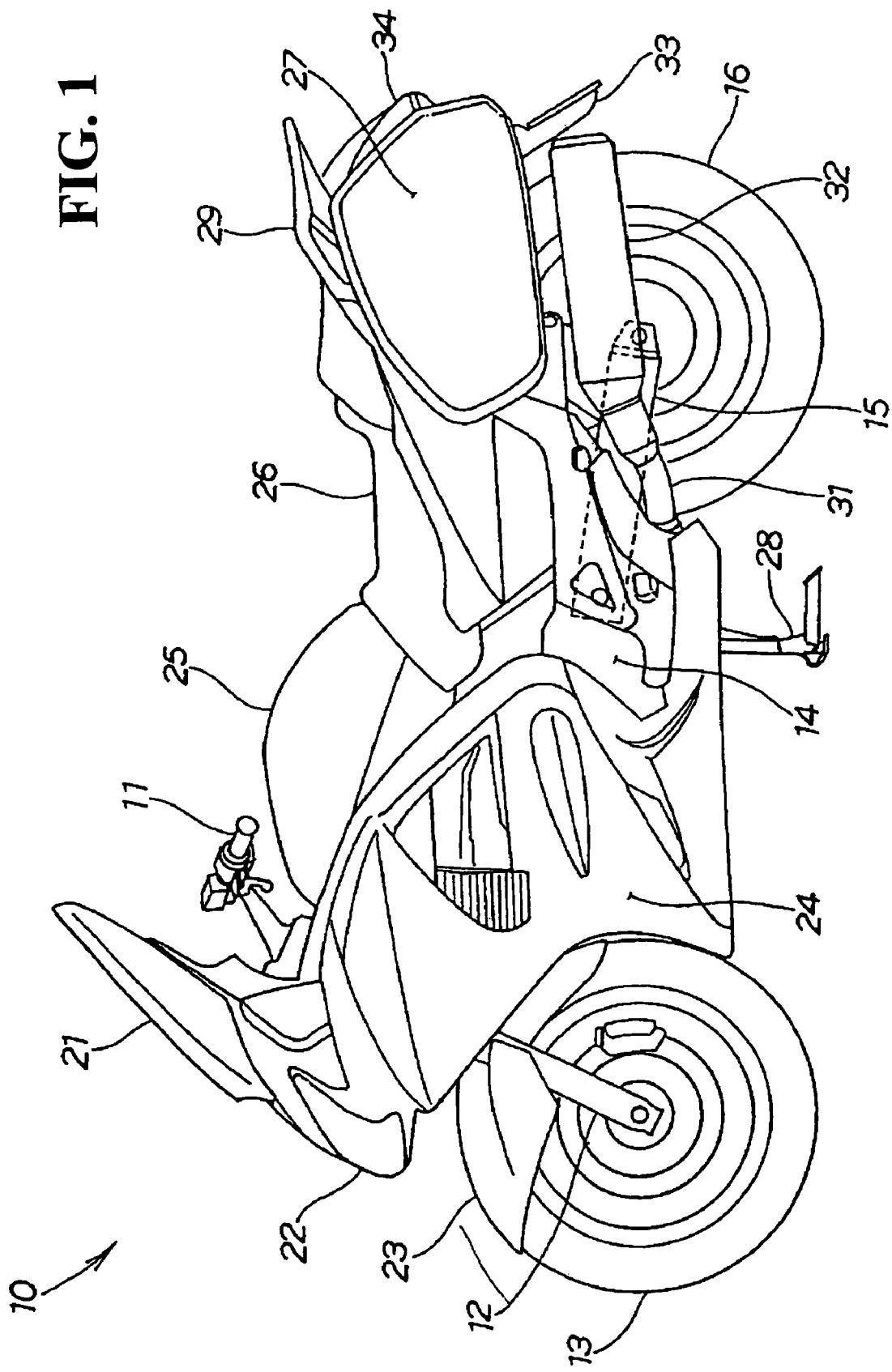
FIG. 1 is a left-side view of a motorcycle which adopts a shaft-drive-type power transmission device according to the present invention

The present invention will now be described in detail with reference to the accompanying drawings, wherein the same reference numerals will be used to identify the same or similar elements throughout the several views. It should be noted that the drawings should be viewed in the direction of orientation of the reference numerals.

FIG. 1 is a left side view of a motorcycle that adopts a shaft-drive-type power transmission device according to the present invention. A motorcycle 10 is a vehicle which arranges a handle 11, a front fork 12 and a front wheel 13 steered by the handle 11 on a vehicle-body front portion thereof, arranges a vehicle body frame 14 in a state that the vehicle body frame 14 extends from the vehicle-body front portion to a vehicle-body center portion, mounts an engine (not shown in the drawings) on the vehicle body frame 14, swingably mounts a swing arm 15 on a lower portion of the vehicle body frame 14, and mounts a wheel (rear wheel) 16 on a rear end of the swing arm 15.

An output of the engine is transferred to the rear wheel 16 with a shaft drive device (described below) which is a power transmission mechanism constituting a part of the swing arm 15. Reference numeral 21 identifies a wind screen, reference numeral 22 identifies a head lamp, reference numeral 23 identifies a front fender, reference numeral 24 identifies a cowling, reference numeral 25 identifies a fuel tank, reference numeral 26 identifies a seat, reference numeral 27 identifies a luggage box, reference numeral 28 identifies a stand, reference numeral 29 identifies a grab rail, reference numeral 31 identifies an exhaust pipe, reference numeral 32 identifies a muffler, reference numeral 33 identifies a rear fender, and reference numeral 34 identifies a tail lamp.

Figure 2:
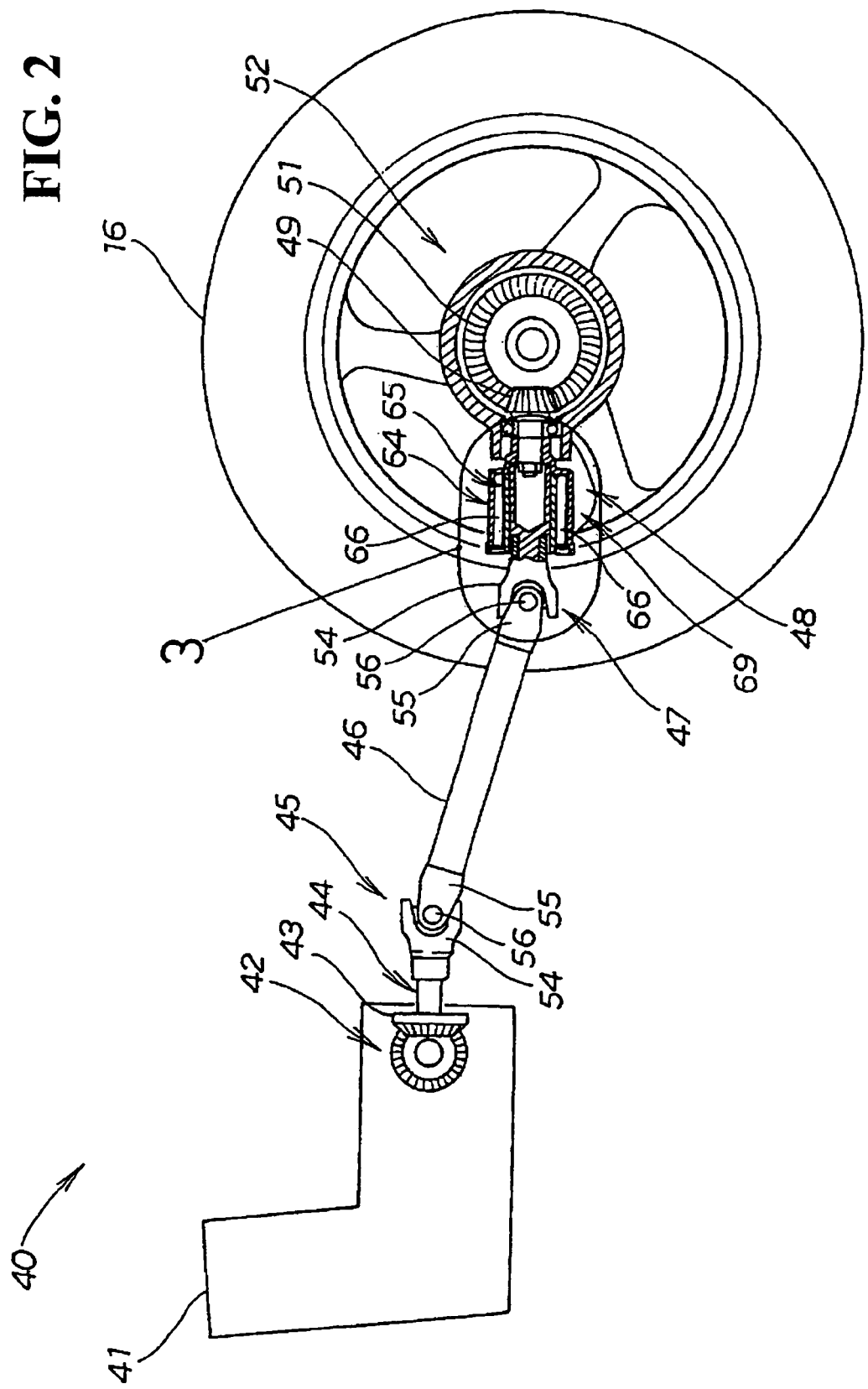
FIG. 2 is a side view of the shaft-drive-type power transmission device according to the present invention.

FIG. 2 is a side view of the shaft-drive-type power transmission device according to the present invention. The shaft-drive-type power transmission device 40 of the vehicle includes an output shaft 44 which is connected to a transmission 42 of the engine 41 by way of an output-shaft-side bevel gear 43, a propeller shaft 46 which has one end thereof connected to the output shaft 44 by way of a first universal joint 45, an input shaft 48 which is connected to another end of the propeller shaft 46 by way of a second universal joint 47, and a wheel-side bevel gear 51 which is connected to the input shaft 48 by way of an input-shaft-side bevel gear 49.

A final reduction gear 52 is constituted of the input-shaft-side bevel gear 49 and the wheel-side bevel gear 51. The first universal joint 45 is constituted of one yoke 54 which is mounted on an engine-41-side, another yoke 55 which is mounted on a propeller-shaft-46-side, and a cross shaft 56 which is interposed between the yokes 54, 55. The second universal joint 47 is a joint having the same constitution as the first universal joint 45.

Figure 3:
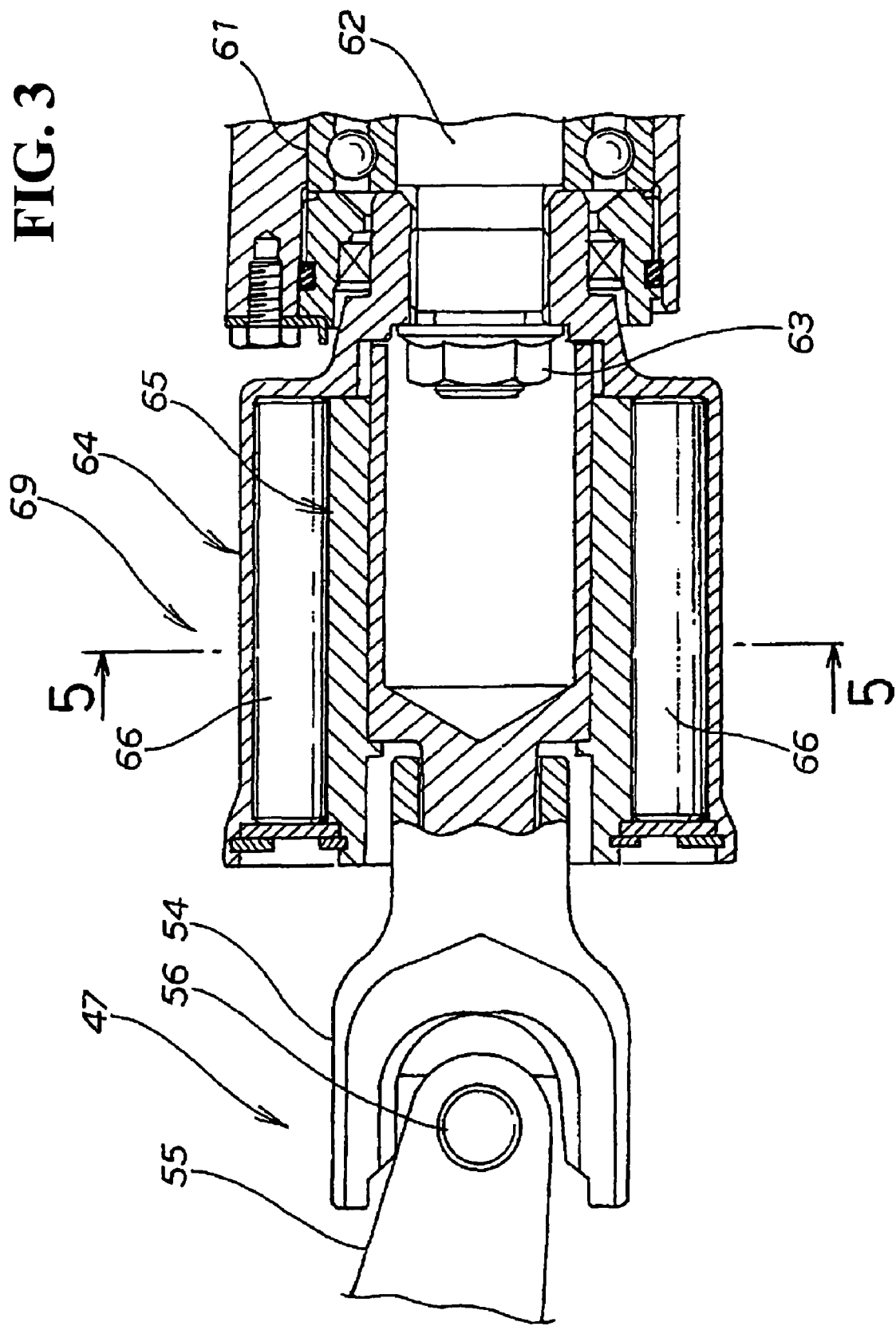
FIG. 3 is an enlarged view of a portion indicated by numeral 3 in FIG. 2.

FIG. 3 is an enlarged view of a part 3 shown in FIG. 2. The input shaft 48 is constituted of a shaft member 62 which is rotatably supported on the vehicle body side by way of a bearing 61 for supporting the input-shaft-side bevel gear 49 (see FIG. 2), an outer sleeve 64 which is joined to the shaft member 62 using a nut 63, an inner sleeve 65 which is connected to the second universal joint 47, and a plurality of cylindrical resilient members 66 which is interposed between the outer sleeve 64 and the inner sleeve 65. In particular, as shown in FIGS. 2 and 3, the damper mechanism 69 has a first end connected to the propeller shaft 46, and a second end locked to the input shaft 48 by the nut 63 within the damper mechanism 69. The second end of the damper mechanism 69 is opposite to the first end of the damper mechanism 69. The first end of the damper mechanism 69 is closer to the propeller shaft 46 than to the input shaft 48. The second end of the damper mechanism 69 is closer to the input shaft 48 than to the propeller 46. The nut 63 is located at the second end of the damper mechanism 69 farther from the propeller shaft 46 than from the input shaft 48, and the nut 63 is located at a distal end of the shaft member 62 of the input shaft 48 and is aligned with the shaft member 62 of the input shaft 48.

Figure 4:
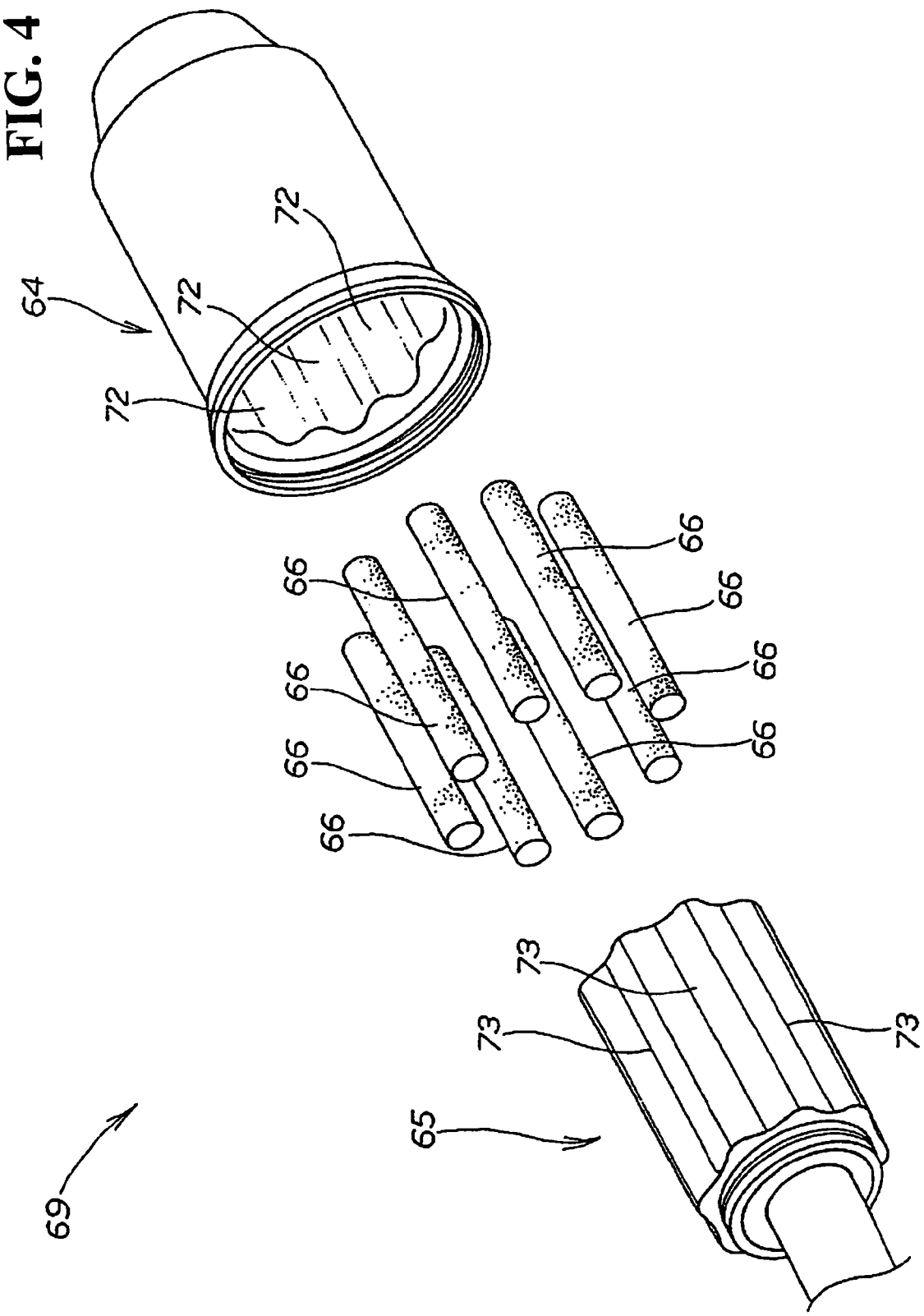
FIG. 4 is an exploded perspective view showing a damper mechanism of the shaft-drive-type power transmission device shown in FIG. 3.
Figure 5:
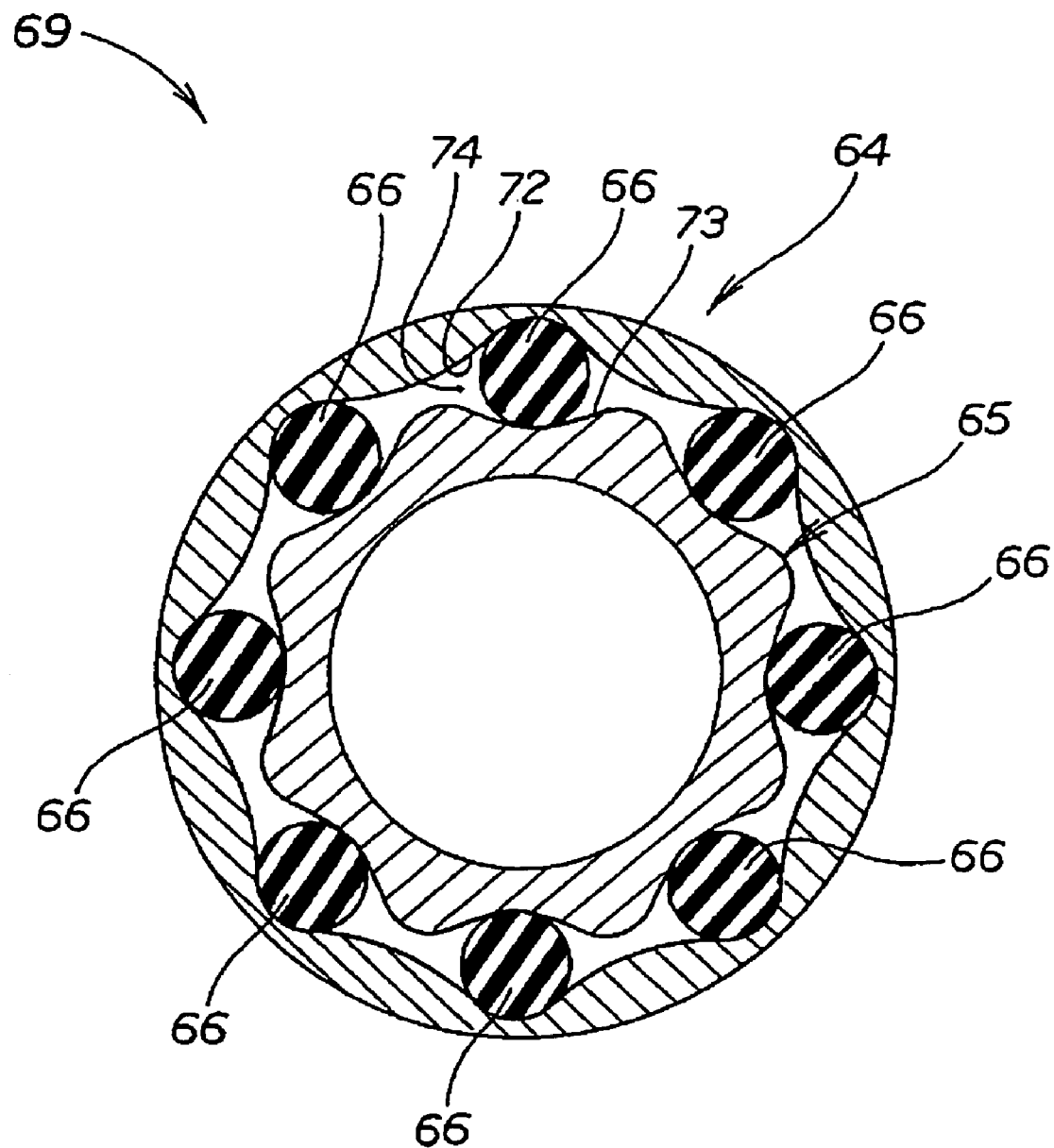
FIG. 5 is a view taken along a line 5-5 in FIG. 3.

FIG. 4 is an exploded perspective view showing a damper mechanism of the shaft-drive-type power transmission device shown in FIG. 3, and FIG. 5 is a cross-sectional view taken along a line 5-5 in FIG. 3. The damper mechanism 69 is constituted of the outer sleeve 64, the inner sleeve 65, and the plurality of cylindrical resilient members 66.

The outer sleeve 64 is a part which is connected to a final reduction gear (see FIG. 2) 52 side, and the outer sleeve 64 includes a plurality of outer-sleeve-side recessed portions 72 which are formed in an inner peripheral surface of the outer sleeve 64 in the circumferential direction at an equal pitch and, at the same time, have a predetermined length in the axial direction.

The plurality of outer-sleeve-side recessed portions 72 are formed in a corrugated shape which is formed of continuous curves as viewed in a cross section in the circumferential direction.

The inner sleeve 65 is a part which is connected to the engine 41 side, and the inner sleeve 65 includes inner-sleeve-side recessed portions 73 as many as the outer-sleeve-side recessed portions 72, wherein the inner-sleeve-side recessed portions 73 are formed in an outer peripheral surface of the inner sleeve 65 in the circumferential direction at an equal pitch and, at the same time, have a predetermined length in the axial direction.

The plurality of inner-sleeve-side recessed portions 73 is formed into a corrugated shape which is formed of continuous smooth curves as viewed in a cross section in the circumferential direction.

The cylindrical resilient members 66 are rod-like resilient members, and the respective cylindrical resilient members 66 are accommodated in gaps (accommodating portions) 74 each of which is defined between one outer-sleeve-side recessed portion 72 and one inner-sleeve-side recessed portion 73 one by one.

Figure 6A:
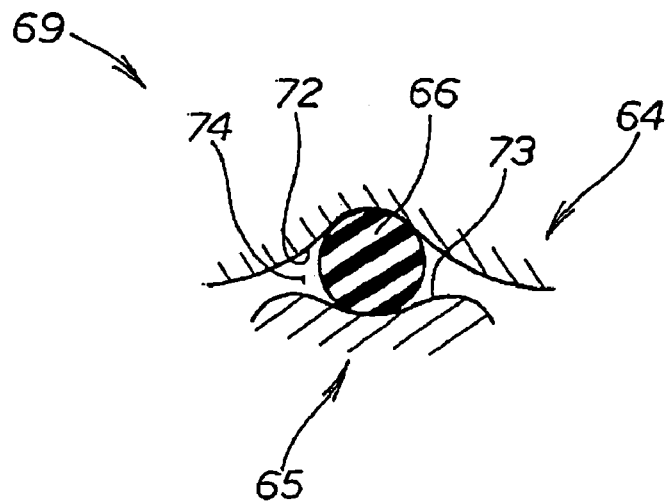
FIGS. 6(a) to 6(c) are explanatory views showing the manner of operation of the damper mechanism shown in FIG. 3.
Figure 6B:
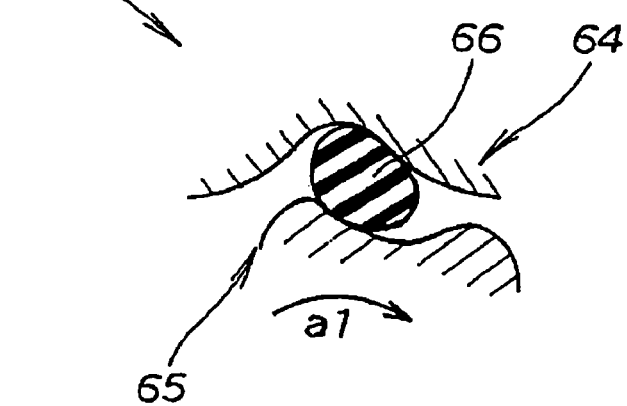
Figure 6C:
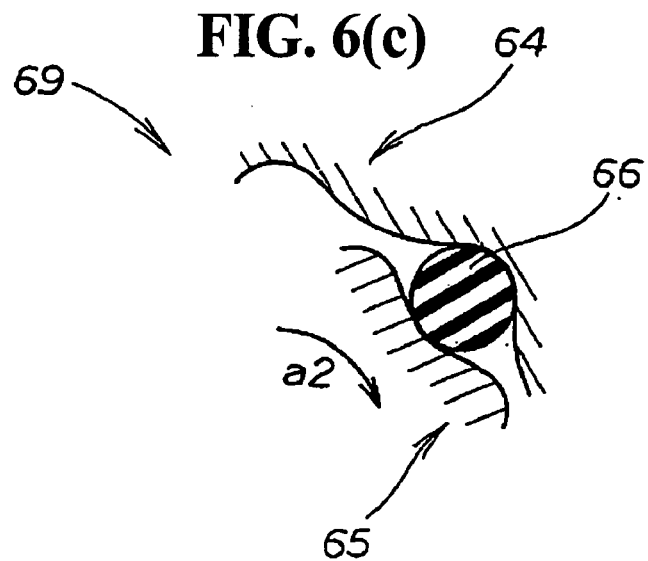

FIG. 6(a) to FIG. 6(c) are explanatory views showing the manner of operation of the damper mechanism shown in FIG. 3.

FIG. 6(a) shows a state of the outer sleeve 64, the inner sleeve 65 and the cylindrical resilient members 66 when a transmission torque is not generated in the damper mechanism 69, wherein the outer sleeve 64 and the inner sleeve 65 are stopped and a cross-sectional shape of the cylindrical resilient member 66 holds an initial-state perfect circle.

FIG. 6(b) shows a state of the outer sleeve 64, the inner sleeve 65 and the cylindrical resilient members 66 when the transmission torque is generated in the damper mechanism 69, wherein the outer sleeve 64 and the inner sleeve 65 are rotated in the direction indicated by an arrow a1. Here, the inner sleeve 65 advances in the direction indicated by the arrow a1 relative to the outer sleeve 64 and hence, the cross-sectional shape of the cylindrical resilient member 66 is collapsed.

FIG. 6(c) shows, for example, a state of the outer sleeve 64, the inner sleeve 65 and the cylindrical resilient members 66 when the transmission torque is increased in the damper mechanism 69 attributed to locking of the rear wheel 16 (see FIG. 1) or the like, wherein the inner sleeve 65 slips relative to the outer sleeve 64 as indicated by an arrow a2. As a result, it is possible to prevent the excessively large torque from being applied to the power transmission path such as the output shaft 44, the propeller shaft 46 and the input shaft 48 shown in FIG. 2.

In general, it has been known that a large torque is transmitted to the power transmission path from the rear wheel when a rapid shift-down is performed, and a large torque is transmitted to the power transmission path from the engine when the vehicle starts from a stopped state or when a clutch is engaged in a state that a rotational speed of the engine is high.

That is, in FIG. 2 and FIG. 3, a damper mechanism 69 is provided in the course of the power transmission path from the engine 41 to the final reduction gear 52. The damper mechanism 69 transmits a torque from the engine 41 or the wheel (rear wheel) 16 until the torque reaches a predetermined value, and prevents the transmission of a torque that exceeds the predetermined value. Hence, it is possible to prevent an excessively large rotational torque from being exerted on the power transmission path. As a result, it is possible to reduce the rigidity of the constitutional parts of the power transmission path from the engine 41 to the final reduction gear 52, thus realizing the reduction of weight of the shaft-drive-type power transmission device 40.

Further, in FIG. 1 and FIG. 2, the shaft-drive-type transmission device 40 is mounted on the motorcycle 10 (see FIG. 1) and hence, for example, different from the motorcycle which adopts a chain-drive-type power transmission device, it is unnecessary to frequently adjust the elongation of a chain. Accordingly, it is possible to prolong an interval of maintenance or inspection.

In FIG. 4 and FIG. 5, the damper mechanism 69 is constituted of the outer sleeve 64 which is connected to the final reduction gear 52 (see FIG. 2) side; the plurality of the outer-sleeve-side recessed portions 72 which are formed on the inner peripheral surface of the outer sleeve 64 at an equal pitch in the circumferential direction and have the axially predetermined length; the inner sleeve 65 which are connected to the engine 41 (see FIG. 2) side; the inner-sleeve-side recessed portions 73 as many as the outer-sleeve-side recessed portions 72 which are formed on an outer peripheral surface of the inner sleeve 65 at an equal pitch in the circumferential direction and have an axially predetermined length; and the plurality of cylindrical resilient members 66 which are accommodated between the inner-sleeve-side recessed portions 73 and the outer-sleeve-side recessed portions 72 in a state that the respective cylindrical resilient members 66 are accommodated gaps between the inner-sleeve-side recessed portion 73 and the outer-sleeve-side recessed portions 72 and hence, it is possible to absorb an impact using the plurality of the cylindrical resilient members 66 and, at the same time, to reduce the applying of the torque which exceeds the predetermined value (excessively large torque) exerted to the power transmission path by allowing the smooth slippage between the outer sleeve 64 and the inner sleeve 65 when a load change is generated.

In FIG. 5, the plurality of outer-sleeve-side recessed portions 72 and the plurality of inner-sleeve-recessed portions 73 are respectively formed in a corrugated shape which is formed of continuous curves as viewed in the cross section in the circumferential direction and hence, it is possible to provide a smooth slippage between the outer sleeve 64 and the inner sleeve 65.

FIG. 7(a) to FIG. 7(e) are comparative explanatory views showing the manner of operation of the shaft-drive-type power transmission device shown in FIG. 2, wherein FIG. 7(a) to FIG. 7(c) show a shaft-drive-type power transmission device 140 of a comparison example and FIG. 7(d) to FIG. 7(f) show the shaft-drive-type power transmission device 40 of the embodiment.

In FIG. 7(a), the shaft-drive-type power transmission device 140 includes an output shaft 144 which extends from an engine (not shown in the drawing) and outputs a rotational driving force of the engine, a propeller shaft 146 which has one end thereof connected to the output shaft 144 by way of a first universal joint 145 and transmits a rotational driving force of the engine, and an input shaft 148 which is connected to another end of the propeller shaft 146 by way of a second universal joint 147 and inputs the rotational driving force of the engine into a wheel side final reduction gear (not shown in the drawing), wherein a damper mechanism 149 which dampens impacts is provided to the propeller shaft 146.

FIG. 7(b) is a cross-sectional view taken along a line b-b in FIG. 7(a) and shows a phase of the first universal joint 145. Further, FIG. 7(c) is a cross-sectional view taken along a line c-c in FIG. 7(a) and shows a phase of the second universal joint 147.

In FIG. 7(b) and FIG. 7(c), when the torque is applied to the power transmission path such as the output shaft 144, the propeller shaft 146 and the input shaft 148, a phase difference of the second universal joint 147 is generated relative to the first universal joint 145.

In general, there has been known a phenomenon that, when two shafts are connected with each other using a universal joint and these shafts are used in a bent form by a universal joint, a rotational speed is changed. Here, when one end of a second shaft is connected to a first shaft by way of one universal joint and a third shaft is connected to another end of the second shaft by way of another universal joint, by selectively determining phases of one universal joint and another universal joint, it is possible to cancel a change of the rotational speed generated by one universal joint with a change of the rotational speed generated by another universal joint.

However, in the shaft-drive-type power transmission device 140, the phase difference of the second universal joint 147 arises relative to the first universal joint 145 and hence, the change of the rotational speed can not be canceled sufficiently.

To be more specific, in FIG. 7(a), a graph a1 is a graph showing a change of a rotational speed of the output shaft 144 with time, wherein the time is taken on an axis of abscissas and the rotation speed is taken on an axis of ordinates. That is, when the rotational number of the engine is set to a predetermined value, the rotational speed during the output shaft 144 is rotated by one turn becomes a predetermined value.

A graph a2 is a graph showing the change of a rotational speed of the propeller shaft 146 with time, wherein the time is taken on an axis of abscissas and the rotational speed is taken on an axis of ordinates. The propeller shaft 146 is connected to the output shaft 144 by way of the first universal joint 145, and the change of the rotational speed attributed to the first universal joint 145 is generated during a period in which the propeller shaft 146 is rotated by one turn.

A graph a3 is a graph showing a change of a rotational speed of the input shaft 148 with time when a phase difference is not generated between the first universal joint 145 and the second universal joint 147, wherein the time is taken on an axis of abscissas and a rotational speed is taken on an axis of ordinates. That is, when the phase difference is not generated between the first universal joint 145 and the second universal joint 147, the change of the rotational speed attributed to the first universal joint 145 is canceled by the change of the rotational speed the attributed to the second universal joint 147 and hence, the rotational speed assumes a substantially fixed value. However, in the shaft-drive-type power transmission device 140, the damper mechanism 149 which dampens the impacts is mounted on the propeller shaft 146 and hence, the propeller shaft 146 is twisted and a phase difference is generated in the first universal joint 145 and the second universal joint 147. Accordingly, the change of the rotational speed attributed to the first universal joint 145 can not be canceled by the change of the rotational speed attributed to the second universal joint 147.

A graph a4 is a graph showing a change of a rotational speed of the input shaft 148 with time, wherein the time is taken on an axis of abscissas and the rotational speed is taken on an axis of ordinates, and the rotational speed is changed during a period in which the input shaft 148 is rotated by one turn.

In FIG. 7(d), the shaft-drive-type power transmission device 40 includes the damper mechanism 69 which absorbs the impacts of the power transmission path such as the propeller shaft 46 and the input shaft 48 and, at the same time, transmits a torque transmitted from the engine 41 or the wheel (rear wheel) 16 until the torque reaches a predetermined value and prevents a torque which exceeds a predetermined value from being transmitted when the torque exceeds the predetermined value.

FIG. 7(e) is a cross-sectional view taken along a line e-e in FIG. 7(d) and shows a phase of the first universal joint 45. Further, FIG. 7(f) is a cross-sectional view taken along a line f-f in FIG. 7(d) and shows a phase of the second universal joint 47.

In FIG. 7(e) and FIG. 7(f), also when the rotational torque is transmitted to the power transmission path such as the output shaft 44, the propeller shaft 46 and the input shaft 48, the propeller shaft 46 is not twisted and hence, there is no possibility that the phase difference of the second universal joint 47 is generated relative to the first universal joint 45.

Further, to be more specific, in FIG. 7(d), a graph d1 is a graph showing a change of a rotational speed of the output shaft 44 with time, wherein the time is taken on an axis of abscissas and the rotational speed is taken on an axis of ordinates. That is, when the rotational number of the engine 41 (see FIG. 2) is set to a fixed value, the rotational speed during a period in which the output shaft 44 is rotated by one turn becomes a fixed value.

A graph d2 is a graph showing a change of a rotational speed of the propeller shaft 46 with time, wherein the time is taken on an axis of abscissas and the rotational speed is taken on an axis of ordinates. The propeller shaft 46 is connected to the output shaft 44 by way of the first universal joint 45, and the change of the rotational speed attributed to the first universal joint 45 is generated during a period in which the propeller shaft 46 is rotated by one turn.

In the shaft-drive-type power transmission device 40, the damper mechanism 149 which dampens the impacts is mounted on the input shaft 48 and hence, there exists no possibility that a phase difference is generated between the first universal joint 45 and the second universal joint 47. Accordingly, the change of the rotational speed attributed to the first universal joint 45 can be canceled by the change of the rotational speed attributed to the second universal joint 47.

A graph d3 is a graph showing a change of a rotational speed of the input shaft 48 with time, wherein the time is taken on an axis of abscissas and the rotational speed is taken on an axis of ordinates. The graph d3 shows that the rotational speed assumes a fixed value during a period in which the input shaft 48 is rotated by one turn.

That is, the damper mechanism 69 is mounted on the input shaft 48 and hence, there exists no possibility that a phase difference is generated between the preset first and second universal joints 45, 47. Accordingly, it is possible to suppress the generation of the change of the rotational speed. As a result, it is possible to enhance the riding feeling of the motorcycle 10 (see FIG. 1).

Here, even when the damper mechanism 69 is mounted on the output shaft 44, the same advantageous effects can be obtained.

FIG. 8(a) to FIG. 8(d) are comparative explanatory views showing a torque of the shaft-drive-type power transmission device.

FIG. 8(a) shows a twisting angle of the inner sleeve relative to the outer sleeve corresponding to a torque when a conventional Neidhart cushion is used in the damper mechanism. That is, the twisting angle of the inner sleeve relative to the outer sleeve is taken on an axis of abscissas and the torque is taken on an axis of ordinates, and the torque which is generated in the power transmission path is endlessly increased along with the increase of the twisting angle of the inner sleeve relative to the outer sleeve. Accordingly, there exists a possibility that an excessively large torque is generated in the power transmission path.

FIG. 8(b) shows a damper mechanism 200 when the twisting angle of the inner sleeve relative to the outer sleeve is 0 and the torque is 0. The damper mechanism 200 is constituted of an outer sleeve 201, an inner sleeve 202 which is accommodated in the outer sleeve 201, and a plurality of cylindrical resilient members 203 which are interposed between the outer sleeve 201 and the inner sleeve 202.

FIG. 8(c) shows the damper mechanism 200 when the twisting angle of the inner sleeve relative to the outer sleeve reaches a predetermined value and the torque reaches a predetermined value, wherein the plurality of cylindrical resilient members 203 are deformed.

In FIG. 8(d), the twisting angle of the inner sleeve relative to the outer sleeve is taken on an axis of abscissas and the torque which is generated in the power transmission path is taken on an axis of ordinates. The shaft-drive-type power transmission device 40 includes the damper mechanism 69 which absorbs the impacts in the power transmission path such as the output shaft 44, the propeller shaft 46 and the input shaft 48 which are shown in FIG. 2 and, at the same time, generates a slippage between the inner sleeve and the outer sleeve when the torque exceeds a predetermined value and hence, there exists no possibility that the torque which exceeds a predetermined value is applied to the power transmission path.

Here, on the graph, a point P1 indicates the state shown in FIG. 6(a), a point P2 indicates the state shown in FIG. 6(b) and a point P3 indicates the state shown in FIG. 6(c).

Figure 9:
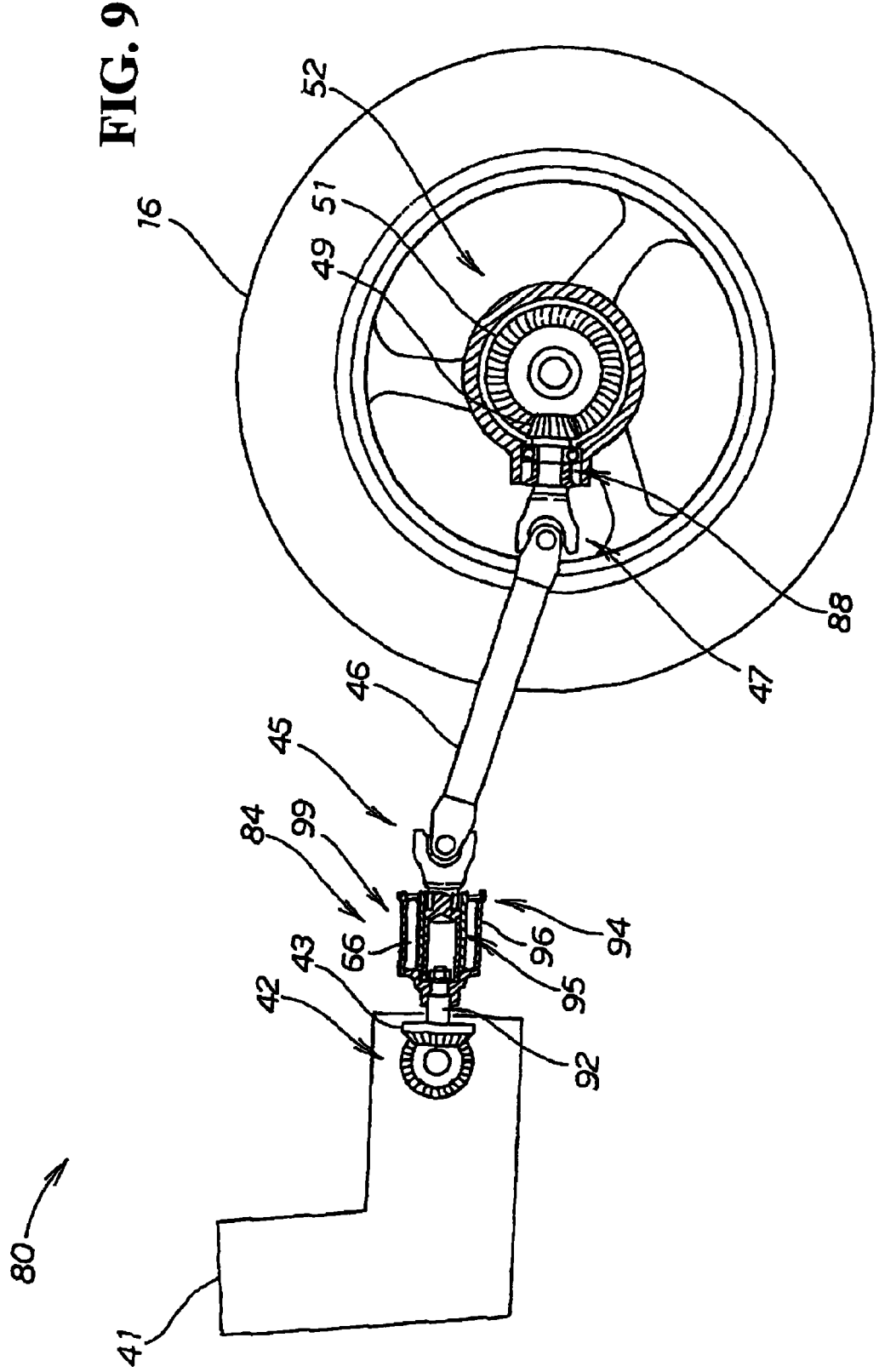
FIG. 9 is a side view of a shaft-drive-type power transmission device of another embodiment according to the present invention.

FIG. 9 is a side view of a shaft-drive-type power transmission device of another embodiment according to the present invention, wherein parts identical with the parts used in the shaft-drive-type power transmission device 40 are indicated by the same numerals and their detailed explanation is omitted.

A shaft-drive-type power transmission device 80 of another embodiment includes an output shaft 84 which is connected to a transmission 42 of an engine 41 by way of an output-shaft-side bevel gear 43, a propeller shaft 46 which has one end thereof connected to the output shaft 84 by way of a first universal joint 45, an input shaft 88 which is connected to another end of the propeller shaft 46 by way of a second universal joint 47, and a wheel-side bevel gear 51 which is connected to the input shaft 88 by way of the input-shaft-side bevel gear 49.

The output shaft 84 includes a shaft member 92 which mounts the output-shaft-side bevel gear 43 on one end thereof and an outer sleeve 94 on another end thereof, an inner sleeve 95 which is connected to the first universal joint 45, and a plurality of cylindrical resilient members 96 which are interposed between the outer sleeve 94 and the inner sleeve 95.

A damper mechanism 99 is constituted of the outer sleeve 94, the inner sleeve 95 and the plurality of cylindrical resilient members 96. The damper mechanism 99 has the substantially same constitution as the damper mechanism 69.

That is, the damper mechanism 99 is mounted on the output shaft 84 and hence, it is possible to reduce an unsprung weight. In particular, as shown in FIG. 9, the damper mechanism 99 has a first end connected to the propeller shaft 46, and a second end locked to the output shaft 84 by a nut within the damper mechanism 99. The second end of the damper mechanism 99 is opposite to the first end of the damper mechanism 99. The first end of the damper mechanism 99 is closer to the propeller shaft 46 than to the output shaft 84. The second end of the damper mechanism 99 is closer to the output shaft 84 than to the propeller 46. The nut is located at the second end of the damper mechanism 99 farther from the propeller shaft 46 than from the output shaft 84, and the nut is located at a distal end of the shaft member 92 of the output shaft 84 and is aligned with the shaft member 92 of the output shaft 84. As a result, the riding feeling of the motorcycle can be enhanced.

Here, in the shaft-drive-type power transmission device according to the present invention, as shown in FIG. 3, the outer sleeve 64 is connected to the final reduction gear 52 side, and the inner sleeve 65 is connected to the engine 41 side. However, the shaft-drive-type power transmission device of the present invention is not limited to the above-mentioned constitution, and the outer sleeve may be mounted on the engine side and the inner sleeve may be connected to the final reduction gear side.

In the shaft-drive-type power transmission device according to the present invention, as shown in FIG. 4, the damper mechanism 69 is constituted of the outer sleeve 64, the inner sleeve 65 and the plurality of cylindrical resilient members 66. However, the outer-sleeve-side recessed portion of the outer sleeve and the inner-sleeve-side recessed portion of the inner sleeve may be formed of a resilient member, and a part which corresponds to the cylindrical resilient member 66 may be formed of a rigid body such as a metal.

The shaft-drive-type power transmission device according to the present invention may, as shown in FIG. 1 and FIG. 2, preferably be mounted on the motorcycle. However, the application of the shaft-drive-type power transmission device is not limited to the motorcycle. That is, there is no limitation in applying the shaft-drive-type power transmission device to a light-weighted vehicle such as a three-wheeled vehicle or a four-wheeled vehicle, an ATV (All Terrain Vehicle) or the like.

The shaft-drive-type power transmission device of the vehicle according to the present invention is preferably mounted on a vehicle such as a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A damper mechanism of a shaft-drive-type power transmission device of a vehicle, the shaft-drive-type power transmission device comprising an output shaft extending from an engine of the vehicle, an input shaft connected to a final reduction gear, and a propeller shaft between the output shaft and the input shaft, said damper mechanism being provided in a power transmission path from the engine of the vehicle to the final reduction gear of the vehicle, said damper mechanism transmitting a torque from the engine or a wheel of the vehicle until the torque reaches a predetermined value, and said damper mechanism preventing the transmission of a torque that exceeds the predetermined value, wherein the damper mechanism has a first end connected to the propeller shaft, and a second end locked to one of the output shaft and the input shaft by a nut within the damper mechanism, the second end being opposite to the first end, the first end being closer to the propeller shaft than to the one of the output shaft and the input shaft, the second end being closer to the one of the output shaft and the input shaft than to the propeller, wherein the nut is located at the second end farther from the propeller shaft than from the one of the output shaft and the input shaft, and the nut is located at a distal end of a shaft member of the one of the output shaft and the input shaft and is aligned with the shaft member of the one of the output shaft and the input shaft, wherein the damper mechanism further comprises:
an outer sleeve connected to either one of an engine side and a final reduction gear side;
a plurality of outer-sleeve-side recessed portions formed on an inner peripheral surface of the outer sleeve at an equal pitch in the circumferential direction, each of the plurality of outer-sleeve-side recessed portions having an axially predetermined length;
an inner sleeve connected to another of the final reduction gear side and the engine side;
inner-sleeve-side recessed portions formed on an outer peripheral surface of the inner sleeve at an equal pitch in the circumferential direction, said inner-sleeve-side recessed portions having a number the same as the number of outer-sleeve-side recessed portions and having an axially predetermined length; and
a plurality of cylindrical resilient members respectively accommodated between one of the inner-sleeve-side recessed portions and one of the outer-sleeve-side recessed portions,
wherein the outer sleeve is locked to the one of the output shaft and the input shaft by the nut inside the outer sleeve, and wherein the nut is located at an end of the outer sleeve closer to the engine when the outer sleeve is locked to the output shaft, and is located at an end of the outer sleeve closer to the final reduction gear when the outer sleeve is locked to the input shaft, and
wherein the nut does not overlap with the cylindrical resilient members in an axial direction of the damper mechanism.

2. The damper mechanism according to claim 1, wherein the vehicle is a motorcycle.

3. The damper mechanism according to claim 1, wherein the damper mechanism is mounted on the output shaft.

4. The damper mechanism according to claim 1, wherein the plurality of outer-sleeve-side recessed portions and the plurality of inner-sleeve-side recessed portions are formed in a corrugated shape that is formed of continuous curves as viewed in cross section in the circumferential direction.

5. The damper mechanism according to claim 1, wherein the outer sleeve is connected to the final reduction gear side and the inner sleeve is connected to the engine side.

6. The damper mechanism according to claim 1, wherein the inner-sleeve-side recessed portions and the outer-sleeve-side recessed portions for a plurality of gaps between the inner sleeve and the outer sleeve, and the plurality of cylindrical resilient members are respectively accommodated in the gaps.

7. A shaft-drive-type power transmission device of a vehicle comprising:
an output shaft that extends from and outputs a rotational driving force of an engine of the vehicle;
a propeller shaft that has one end thereof connected to the output shaft by way of a first universal joint and transmits the rotational driving force of the engine; and
an input shaft that is connected to another end of the propeller shaft by way of a second universal joint and inputs the rotational driving force of the engine to a final reduction gear on a wheel side,
wherein a damper mechanism is provided in a power transmission path from the engine to the final reduction gear, said damper mechanism transmitting a torque from the engine or a wheel until the torque reaches a predetermined value, said damper mechanism preventing the transmission of a torque that exceeds the predetermined value, wherein the damper mechanism has a first end connected to the propeller shaft, and a second end locked to one of the output shaft and the input shaft by a nut within the damper mechanism, the second end being opposite to the first end, the first end being closer to the propeller shaft than to the one of the output shaft and the input shaft, the second end being closer to the one of the output shaft and the input shaft than to the propeller, and wherein the nut is located at the second end farther from the propeller shaft than from the one of the output shaft and the input shaft, and the nut is located at a distal end of a shaft member of the one of the output shaft and the input shaft and is aligned with the shaft member of the one of the output shaft and the input shaft.

8. The shaft-drive-type power transmission device according to claim 7, wherein the vehicle is a motorcycle.

9. The shaft-drive-type power transmission device according to claim 7, wherein the damper mechanism is mounted on the output shaft.

10. The shaft-drive-type power transmission device according to claim 7, wherein the damper mechanism further comprises:

an outer sleeve connected to either one of an engine side and a final reduction gear side;

a plurality of outer-sleeve-side recessed portions formed on an inner peripheral surface of the outer sleeve at an equal pitch in the circumferential direction, each of the plurality of outer-sleeve-side recessed portions having an axially predetermined length;

an inner sleeve connected to another of the final reduction gear side and the engine side;

inner-sleeve-side recessed portions formed on an outer peripheral surface of the inner sleeve at an equal pitch in the circumferential direction, said inner-sleeve-side recessed portions having a number the same as the number of outer-sleeve-side recessed portions and having an axially predetermined length; and a plurality of cylindrical resilient members respectively accommodated between one of the inner-sleeve-side recessed portions and one of the outer-sleeve-side recessed portions.

11. The shaft-drive-type power transmission device according to claim 10, wherein the plurality of outer-sleeve-side recessed portions and the plurality of inner-sleeve-side recessed portions are formed in a corrugated shape that is formed of continuous curves as viewed in cross section in the circumferential direction.

12. The shaft-drive-type power transmission device according to claim 10, wherein the outer sleeve is connected to the final reduction gear side and the inner sleeve is connected to the engine side.

13. The shaft-drive-type power transmission device according to claim 10, wherein the inner-sleeve-side recessed portions and the outer-sleeve-side recessed portions for a plurality of gaps between the inner sleeve and the outer sleeve, and the plurality of cylindrical resilient members are respectively accommodated in the gaps.

14. The shaft-drive-type power transmission device according to claim 10, wherein the outer sleeve is locked to the one of the output shaft and the input shaft by the nut inside the outer sleeve, and wherein the nut is located at an end of the outer sleeve closer to the engine when the outer sleeve is locked to the output shaft, and is located at an end of the outer sleeve closer to the final reduction gear when the outer sleeve is locked to the input shaft.

* * * * *